US012247721B1

(12) United States Patent
Chen

(10) Patent No.: US 12,247,721 B1
(45) Date of Patent: Mar. 11, 2025

(54) LIGHTING FIXTURE AND LIGHTING DEVICE

(71) Applicant: Baowen Chen, Guangdong (CN)

(72) Inventor: Baowen Chen, Guangdong (CN)

( * ) Notice: Subject to any disclaimer, the term of this patent is extended or adjusted under 35 U.S.C. 154(b) by 0 days.

(21) Appl. No.: 18/914,075

(22) Filed: Oct. 12, 2024

(30) Foreign Application Priority Data

Sep. 12, 2024 (CN) ........................ 202422241648.X

(51) Int. Cl.
*F21V 17/06* (2006.01)
*F21V 23/00* (2015.01)
*F21V 23/06* (2006.01)
*F21W 121/04* (2006.01)

(52) U.S. Cl.
CPC ............ *F21V 17/06* (2013.01); *F21V 23/002* (2013.01); *F21V 23/06* (2013.01); *F21W 2121/04* (2013.01)

(58) Field of Classification Search
CPC ........ F21V 17/06; F21V 23/003; F21V 23/06; F21W 2121/04
See application file for complete search history.

(56) References Cited

U.S. PATENT DOCUMENTS 5,570,952 A * 11/1996 Protz, Jr. ............... F21V 21/116 248/74.1
6,336,733 B1 * 1/2002 Huang .................... F21V 17/16 362/396
6,461,018 B1 * 10/2002 Chanslor ................. F21S 6/001 362/431
2002/0089854 A1 * 7/2002 Liu ........................... F21V 3/00 362/311.06
2005/0117338 A1 * 6/2005 Kratz .................... F21V 21/002 362/183
2009/0251923 A1 * 10/2009 Yu ......................... F21V 31/005 362/653
2011/0194292 A1 * 8/2011 Tsai ........................ F21V 31/04 362/231
2021/0156530 A1 * 5/2021 Huang ...................... F21V 1/12

OTHER PUBLICATIONS

Qin, CN 110792937, Feb. 2020 (Year: 2020).*

* cited by examiner

*Primary Examiner* — Mary Ellen Bowman
(74) *Attorney, Agent, or Firm* — Daniel M. Cohn; Howard M. Cohn

(57) ABSTRACT

A lighting fixture, a lighting device, a light source component, a lampshade, and a fixing base are provided. The lampshade is disposed around an exterior of the light source component, the lampshade includes a first lampshade body and a second lampshade body, the first lampshade body is detachably connected to the second lampshade body. The fixing base is detachably connected to the first lampshade body and the second lampshade body, and is configured to fix the first lampshade body and the second lampshade body. The lighting fixture and the lighting device are capable of reducing space required for transportation and storage and further improving logistics efficiency.

19 Claims, 9 Drawing Sheets

LIGHTING FIXTURE AND LIGHTING DEVICE

TECHNICAL FIELD

The present disclosure relates to a technical field of lighting fixtures, and in particular to a lighting fixture and a lighting device.

BACKGROUND

Lighting fixtures are used for providing soft and ambient light effects and are generally provided for indoor decoration, outdoor decoration, Christmas installations, lighting, etc.

In the prior art, the lighting fixtures each is generally includes a lampshade, a lamp bead, and a supporting device, which are relatively large in overall sizes and need to occupy more space, thereby being not conducive to transportation and storage,

SUMMARY

Embodiments of the present disclosure provide a lighting fixture and a lighting device, which is capable of reducing space required for transportation and storage and further improving logistics efficiency.

In a first aspect, the embodiments of the present disclosure provide the lighting fixture, including a light source component, a lampshade, and a fixing base. The lampshade is disposed around an exterior of the light source component, the lampshade includes a first lampshade body and a second lampshade body, the first lampshade body is detachably connected to the second lampshade body. The fixing base is detachably connected to the first lampshade body and the second lampshade body, and is configured to fix the first lampshade body and the second lampshade body.

In some embodiments, external threads are respectively disposed on the first lampshade body and the second lampshade body, internal threads are disposed on an inner wall of the fixing base, and the external threads are engaged with the internal threads.

In some embodiments, at least one positioning post is disposed on a first edge of the first lampshade body, at least one positioning hole is defined on a first edge of the second lampshade body, and the at least one positioning post is inserted into the at least one positioning hole; and/or, a first limiting portion is disposed on a second edge of the first lampshade body, a first limiting groove is defined on a second edge of the second lampshade body, the first limiting portion is inserted into the first limiting groove.

In some embodiments, the lighting fixture further includes a connecting component. The connecting component includes a main body, a mounting portion, and a fixing portion, the mounting portion and the fixing portion are connected to the main body. The mounting portion and the fixing portion are spaced apart in an extending direction of the connecting component. The mounting portion is configured to mount the light source component, the fixing portion is detachably connected to the fixing base, and the light source component is fixed on an inner side of the lampshade.

In some embodiments, the connecting component is configured as a cylindrical structure, the mounting portion is formed in a mounting groove defined on a top of the main body, and a bottom of the light source component is inserted into the mounting groove.

In some embodiments, the lighting fixture further includes a wire. A first wiring groove is defined on the top of the main body, and the first wiring groove penetrates through two opposite surfaces of the main body in a thickness direction of the main body. Second wiring grooves are defined on the fixing portion, the wire sequentially passes through the first wiring groove and the second wiring grooves and extends outward.

In some embodiments, the lighting fixture further includes a clamping component, the clamping component is configured to fix the wire on an outer wall surface of the main body.

In some embodiments, a first positioning groove is defined on the outer wall surface of the main body, the clamping component is mounted in the first positioning groove; and/or a second positioning groove is defined on the outer wall surface of the main body, the wire is mounted in the second positioning groove.

In some embodiments, four positioning protrusions are disposed on the outer wall surface of the main body, the four positioning protrusions are centrally symmetrically disposed to form the first positioning groove and the second positioning groove.

In some embodiments, the light source component includes a lamp holder and a lamp bead, the lamp bead is disposed on the lamp holder, and the lamp holder is at least partially inserted into the mounting groove.

In some embodiments, the fixing portion includes a first fixing portion and a second fixing portion, the first fixing portion and the second fixing portion are connected to an outer peripheral surface of the main body. The first fixing portion includes a base portion and at least one second limiting portion, the at least one second limiting portion are respectively connected to an outer side of the base portion. A bottom of the fixing base defines a middle hole and at least one second limiting groove communicated with the middle hole, a diameter of the middle hole is greater than an outer diameter of the base portion, and the diameter of the middle hole is less than both a distance between one end of the at least one second limiting portion away from the base portion and one end of the base portion away from the at least one second limiting portion and an outer diameter of the second fixing portion. The first fixing portion is closer to the mounting portion than the second fixing portion, when the connecting component is at a first angle relative to the fixing base, the main body, the base portion, and the at least one second limiting portion partially pass through the middle hole and the at least one second limiting groove. After the connecting component is rotated and is at a second angle relative to the fixing base, the at least one second limiting portion and the second fixing portion are respectively clamped on an upper surface of the bottom of the fixing base and a lower surface of the bottom of the fixing base.

In some embodiments, the lighting fixture further includes at least one supporting component, the at least one supporting component includes a supporting portion and an assembling portion, the supporting portion is configured to support on a mounting surface. The connecting component further includes a connecting portion, the connecting portion is disposed below the fixing portion, and the connecting portion is detachably connected to the assembling portion.

In some embodiments, the at least one supporting component is configured as a rod-shaped structure, an outer diameter of the supporting portion is gradually decreased in a direction away from the assembling portion.

In some embodiments, the supporting portion a supporting main body and blades, the blades are disposed on the supporting main body at intervals in a circumferential direction of the supporting main body, one end of the supporting main body is connected to the assembling portion. A distance between an outer wall of each of the blades and the supporting main body is gradually decreased in a direction away from the assembling portion In some embodiments, the assembling portion is configured as a cylindrical structure and defines a through hole, the connecting portion includes ribs, the ribs are disposed at intervals along a periphery of the main body and abut against a hole wall of the through hole.

In some embodiments, the assembling portion further includes at least one third positioning groove, the at least one third positioning groove penetrates through the hole wall of the through hole. When the connecting portion is inserted into the assembling portion, a corresponding one of the ribs is mounted in the at least one third positioning groove.

In some embodiments, the lighting fixture further includes a hook, the hook is detachably connected to the fixing base.

According to the present disclosure, the lighting fixture is capable of detaching into individual parts, including the light source component, the lampshade, and the fixing base, so that the space required for the transportation and the storage is reduced and the logistics efficiency is further improved. Moreover, users may select or replace different parts according to needs, for example, styles of the lampshade is changed according to the needs or the light source component is adjusted according to the needs, in this way, applicability and personalization of the lighting fixture are increased. In addition, when one of the parts of the lighting fixture are damaged, the one of the parts of the lighting fixture is enabled to separately replace or maintain without replacing a whole lighting fixture, thereby reducing a maintenance cost and maintenance complexity. The lampshade according to the present disclosure further includes the first lampshade body and the second lampshade body, thereby reducing a space occupied by the lampshade, when the fixing base is connected to the first lampshade body and the second lampshade body, the first lampshade body and the second lampshade body are fixed, thereby improving stability of the lampshade.

In a second aspect, the embodiments of the present disclosure further provides the lighting device, the lighting device includes lighting fixtures having the same structure with the lighting fixture as foregoing. The lighting device further includes wires configured to electrically connect the lighting fixtures in series and a first plug electrically connected to a first one of the wires, and the first one of the wires is connected to a first one of the lighting fixtures locating at a first end of the lighting device.

In some embodiments, the lighting device further includes a second plug, the second plug is electrically connected to a second one of the wires, the second one of the wires is connected to a second one of the lighting fixtures locating at a second end of the lighting device. The second plug is connected to the first plug of another lighting device to achieve a serial connection.

According to the present disclosure, the first plug is electrically connected to the first one of the wires, and the first one of the wires is connected to the first one of the lighting fixtures locating at the first end of the lighting device. In this way, when the first plug is electrically connected to an external power supply, light source components of the lighting fixtures are energized for lighting at the same time. The second plug is electrically connected to the second one of the wires, the second one of the wires is connected to the second one of the lighting fixtures locating at the second end of the lighting device. Specifically, the second plug is connected to the first plug of another lighting device to achieve the serial connection, in this way, all light source components of different lighting devices are electrically connected in series. The present disclosure is capable of electrically connecting different lighting devices in series according to actual needs, a number of the lighting device is conveniently adjusted to modify a lighting layout, so as to achieve a wider lighting range and meet needs of difference usage scenarios.

BRIEF DESCRIPTION OF DRAWINGS

In order to more clearly illustrate embodiments of the present disclosure or technical solutions in the prior art, accompanying drawings required in description of the embodiments or the prior art are briefly described below, and obviously, the accompanying drawings in the following description are merely some embodiments of the present disclosure, and for those who skilled in the art, other drawings may be obtained according to structures shown in these drawings without creative efforts.

Figure 1:
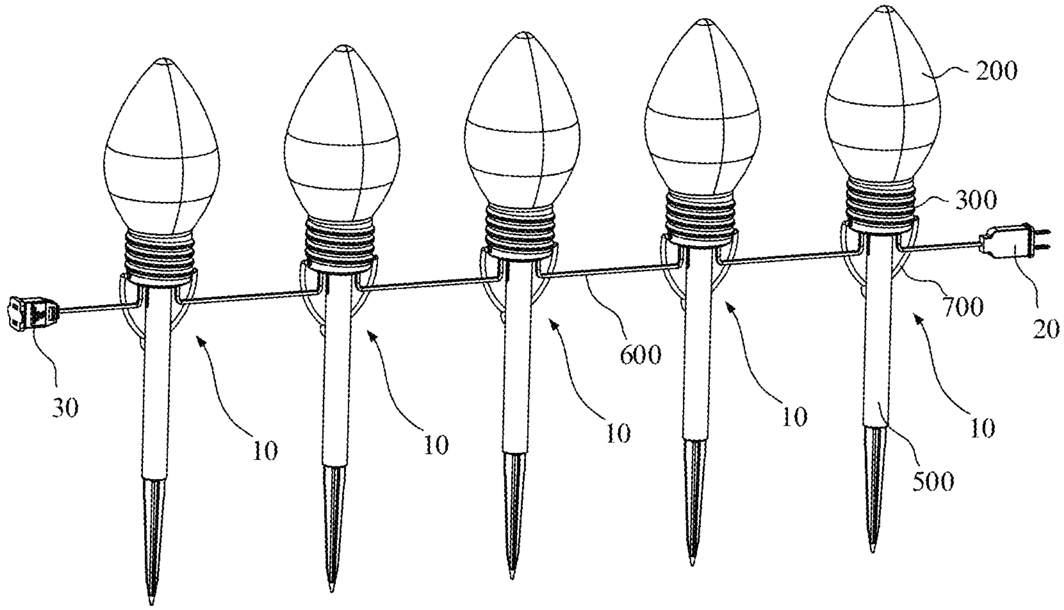
FIG. 1 is a structural schematic diagram of a lighting device according to one embodiment of the present disclosure.

Reference numerals in the drawings: 1. lighting device; 10. lighting fixture; 100. light source component; 110. lamp holder; 120. lamp bead; 200. lampshade; 210. first lampshade body; 211. positioning post; 212. first limiting groove; 220. second lampshade body; 221. positioning hole; 222. second limiting portion; 300. fixing base; 310. middle hole; 320. second limiting groove; 400. connecting component; 410. main body; 411. first wiring groove; 412. first positioning groove; 413. second positioning groove; 414. positioning protrusion; 420. mounting portion; 421. mounting groove; 430. fixing groove; 431. first fixing portion; 4311. base portion; 4312. first limiting portion; 432. second fixing portion; 433. second wiring groove; 440. connecting portion; 441. rib; 500. at least one supporting component; 510. assembling component; 511. through hole; 512. third positioning groove; 520. supporting portion; 521. blade; 5211.

fixing end; 5212. blade end; 522. supporting main body; 600. wire; 700. hook; 20. first plug; 30. second plug; 800. clamping component.

Implementations, functional features, and advantages of the present disclosure are further described with reference to the accompanying drawings in combination with the embodiments.

DETAILED DESCRIPTION OF EMBODIMENTS

In order to better understand technical solutions of the present disclosure, embodiments of the present disclosure are described in detail below with reference to accompanying drawings.

When following description refers to the accompanying drawings, unless otherwise indicated, the same numbers in different drawings represent the same or similar elements. Implementations described in following exemplary embodiments do not represent all implementations consistent with this application. Instead, they are merely examples of apparatuses and methods consistent with some aspects of the present disclosure as recited in appended claims.

In the description of the present disclosure, it should be understood that terms "first", "second", etc. are only used for descriptive purposes, and cannot be understood as indicating or implying relative importance. Those who skilled in the art would understand specific meanings of the foregoing terms in the present disclosure according to specific situations. In addition, in the description of the present disclosure, unless otherwise stated, "a plurality of" means two or more, "and/or" used herein is merely an association relationship describing associated objects. For example, A and/or B may indicate three cases that A exists alone, A and B exist, and B exists alone, and a character "/" in the specification generally indicates an "or" relationship between the associated objects Unless otherwise defined, all technical and scientific terms used herein have the same meaning as commonly understood by those who skilled in the art to which the present disclosure belongs. The terms used in the specification are only for the purpose of describing specific embodiments, and are not intended to limit the present disclosure. As used herein, the term "and/or" includes any and all combinations of one or more of associated listed items.

Figure 2:
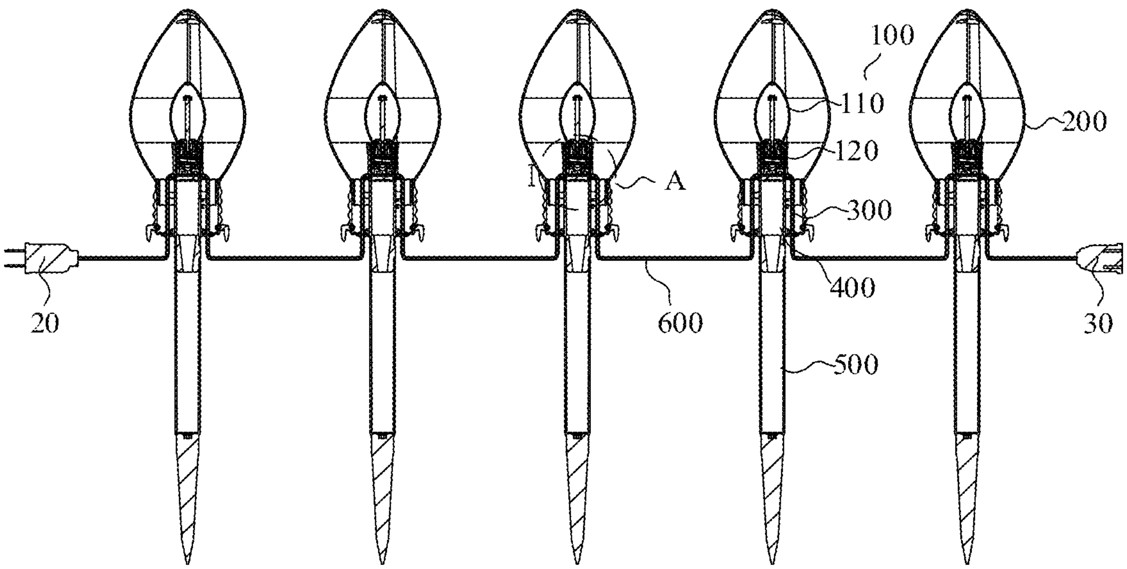
FIG. 2 is a cross-sectional schematic diagram of the lighting device according to one embodiment of the present disclosure.
Figure 3:
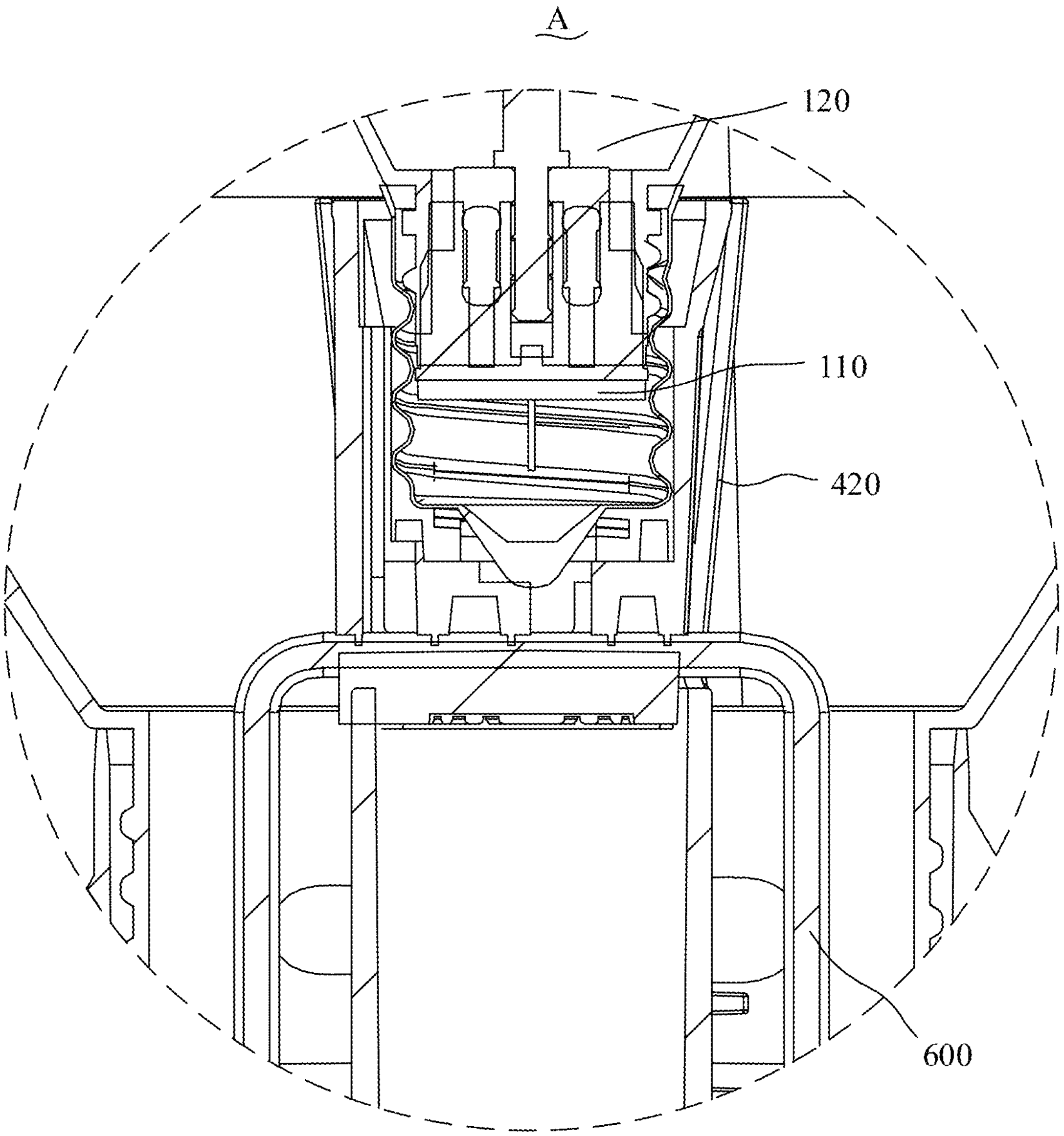
FIG. 3 is an enlarged schematic diagram of portion A shown in FIG. 2.

Please refer to FIGS. 1-3, embodiments of the present disclosure provide a lighting fixture 10, including a light source component 100, a lampshade 200, a fixing base 300, and a connecting component 400.

The light source component 100 is configured to emit light, the lampshade 200 is disposed around an exterior of the light source component 100 for protecting the light source component 100, moreover, the lampshade 200 is further capable of scattering and softening the light, so as to reduce glare from direct light and provide a more comfortable light environment. The fixing base 300 is detachably connected to the lampshade 200. Please refer to FIGS. 4-5, in the embodiment, the lampshade 200 includes a first lampshade body 210 and a second lampshade body 220, the first lampshade body 210 is detachably connected to the second lampshade body 220. The lampshade 200 is designed to consist of the first lampshade body 210 and the second lampshade body 220, which are detachable from each other, thereby further reducing a space required for transportation and storage of the lampshade 200. In some structural forms, at least one positioning post 211 is disposed on a first edge of the first lampshade body 210, at least one positioning hole 221 is defined on a first edge of the second lampshade body 220, and the at least one positioning post 211 is inserted into the at least one positioning hole 221. In some embodiments, two positioning posts 211, three positioning posts 211, or four positioning posts 211 are provided, when the two positioning posts 211 are provided, the two positioning posts 211 are respectively disposed at two ends of the first lampshade body 210. In the present disclosure, the first lampshade body 210 and the second lampshade body 220 are connected through inserting the at least one positioning post 211 into the at least one positioning hole 221, which is easy in both an assembly manner and a disassembly manner and does not require additional assembly aids.

Figure 4:
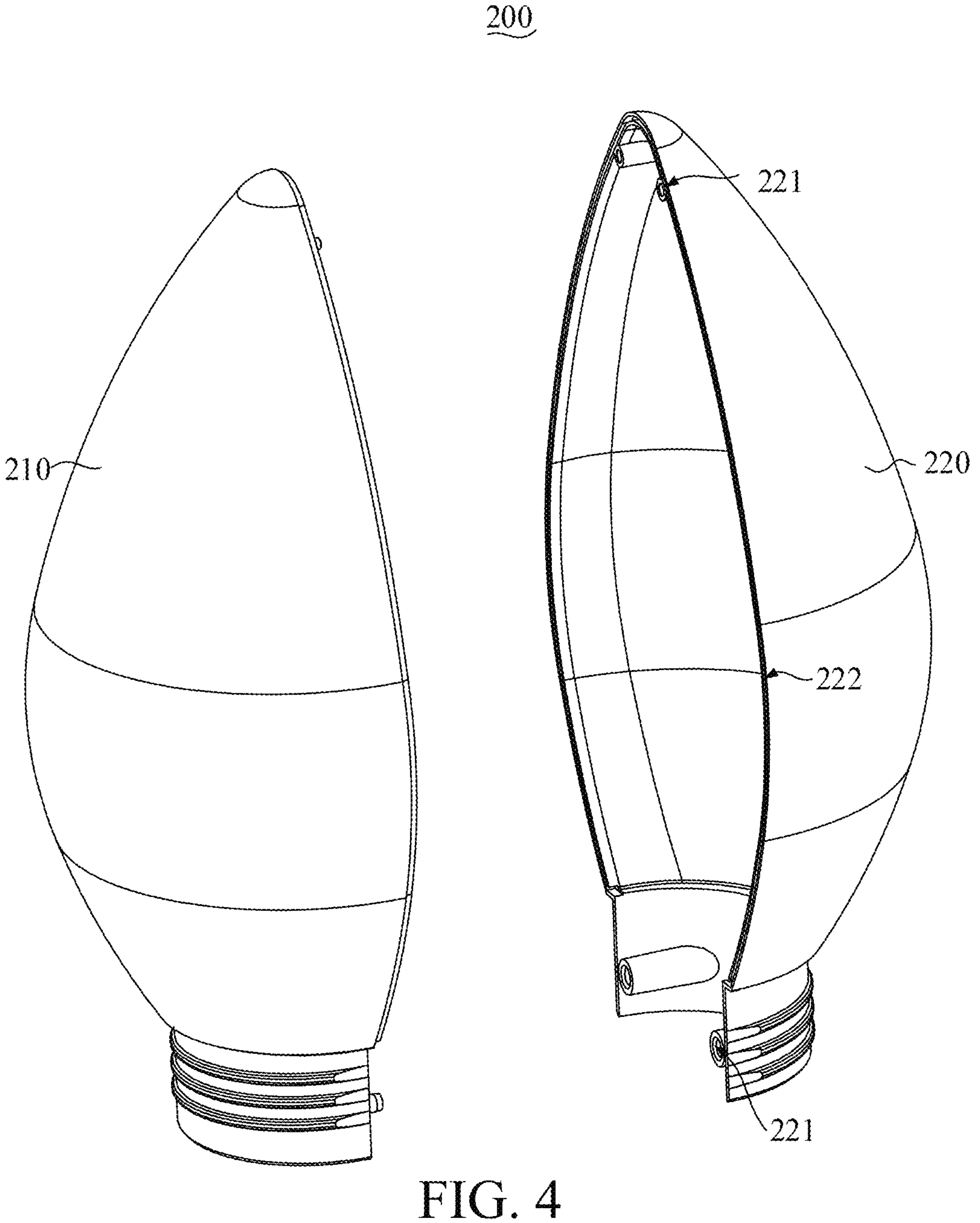
FIG. 4 is a first exploded schematic diagram of a lampshade according to one embodiments of the present disclosure.
Figure 5:
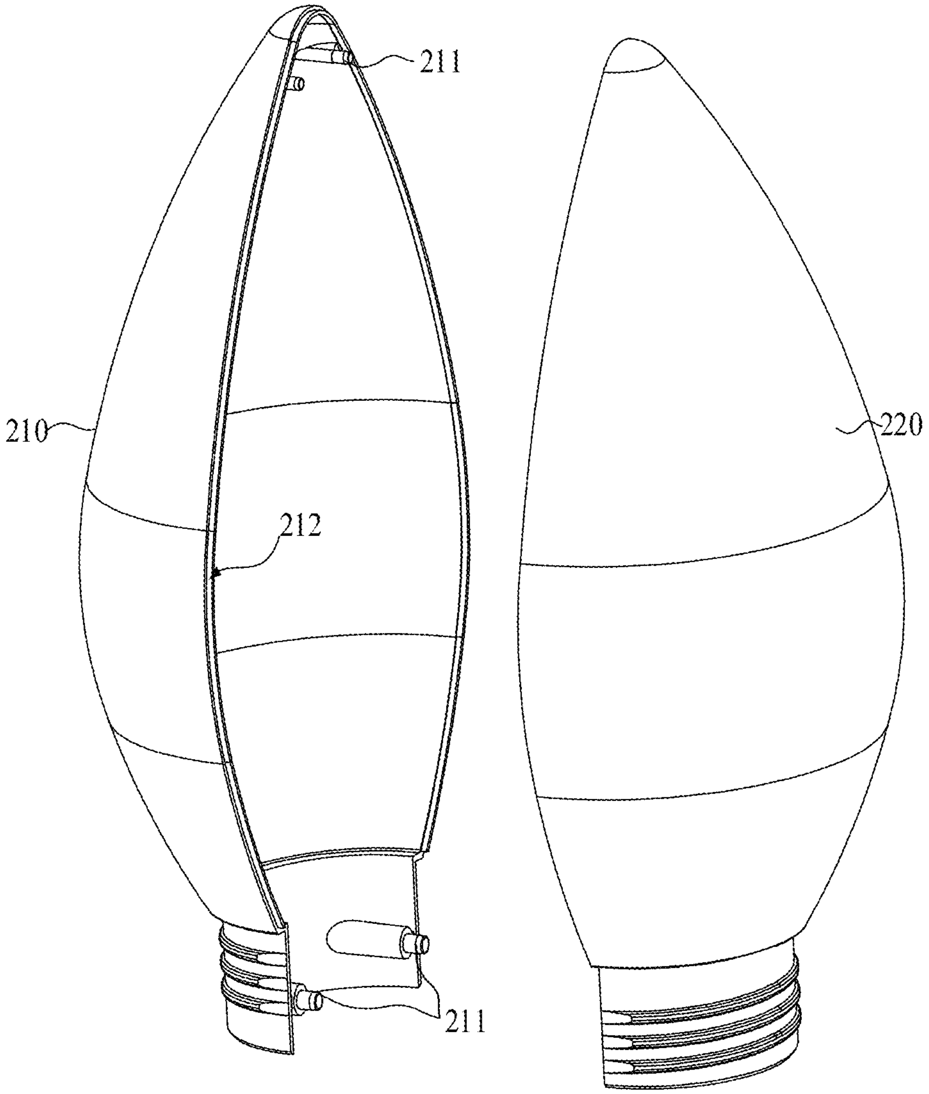
FIG. 5 is a second exploded schematic diagram of the lampshade according to one embodiments of the present disclosure.

Please further refer to FIGS. 4-5, a first limiting portion 222 is disposed on a second edge of the first lampshade body 210, a first limiting groove 212 is defined on a second edge of the second lampshade body 220, the first limiting portion 222 is inserted into the first limiting groove 212. The first limiting groove 212 is matched with the first limiting portion 222 for preventing the first lampshade body 210 and the second lampshade body 220 from deviating after being assembled, thereby improving overall fixing stability.

Furthermore, the first lampshade body 210 includes a first lampshade portion and a first extending portion, the second lampshade body 220 includes a second lampshade portion and a second extending portion. The first lampshade portion and the second lampshade portion are enclosed to cover the light source component 100, and external treads are respectively disposed on outer walls of the first extending portion and the second extending portion. The fixing base 300 configured as a cylindrical structure, internal threads are disposed on an inner wall of the fixing base 300, the external threads are engaged with the internal threads, so that the fixing base 300 is detachably connected to the first lampshade body 210 and the second lampshade body 220 without additional fixing tools, the first lampshade body 210 and the second lampshade body 220 are fixed relative to each other to improve stability of the lampshade 20. Certainly, in other embodiments, the fixing base 300 and the lampshade 200 are detachably connected by clamping, bolt connection, etc.

According to the present disclosure, the lighting fixture 10 is capable of detaching into individual parts, including the light source component 100, the lampshade 200, and the fixing base 300, so that a space required for transportation and storage is reduced and logistics efficiency is further improved. Moreover, users may select or replace different parts according to needs, for example, styles of the lampshade 200 is changed according to the needs or the light source component 100 is adjusted according to the needs, in this way, applicability and personalization of the lighting fixture 10 are increased. In addition, when one of the parts of the lighting fixture 10 are damaged, the one of the parts of the lighting fixture 10 is enabled to separately replace or maintain without replacing a whole lighting fixture 10, thereby reducing a maintenance cost and maintenance complexity. The lampshade 200 according to the present disclosure further includes the first lampshade body 210 and the second lampshade body 220, thereby reducing a space occupied by the lampshade 200, when the fixing base 30 is connected to the first lampshade body 210 and the second lampshade body 220, the first lampshade body 210 and the second lampshade body 220 are fixed, thereby improving stability of the lampshade 200.

The lighting fixture 10 further includes a hook 700, the hook 700 is detachably connected to the fixing base 300. The hook 700 is configured to hang the light source component 100 in different usage scenarios, thereby improving convenience of use of the present disclosure, moreover, the hook 700 is detachable, so that the hook 700 may be replaced with different types in different usage scenarios.

In some embodiment, the lighting fixture 10 further includes a connecting component 400. The connecting component 400 includes a main body 410, a mounting portion 420, and a fixing portion 430, the mounting portion 420 and the fixing portion 430 are connected to the main body 410. The mounting portion 420 and the fixing portion 430 are spaced apart in an extending direction of the connecting component 400. The mounting portion 420 is configured to mount the light source component 100, the fixing portion 430 is detachably connected to the fixing base 300, and the light source component 100 is fixed on an inner side of the lampshade 200.

Specifically, the light source component 100 is first disposed on the mounting portion 420 of the connecting component 400, the fixing portion 430 of the connecting component 400 is connected to the fixing base 300, then the fixing base 300 is assembled with the lampshade 200, at this time, the light source component 100 mounted on the mounting portion 420 extends into the lampshade 200; or, the fixing base 300 is first assembled with the lampshade 200, then the fixing portion 430 of the connecting component 400 is connected to the fixing base 300, at this time, the light source component 100 mounted on the mounting portion 420 extends into the lampshade 200.

Figure 6:
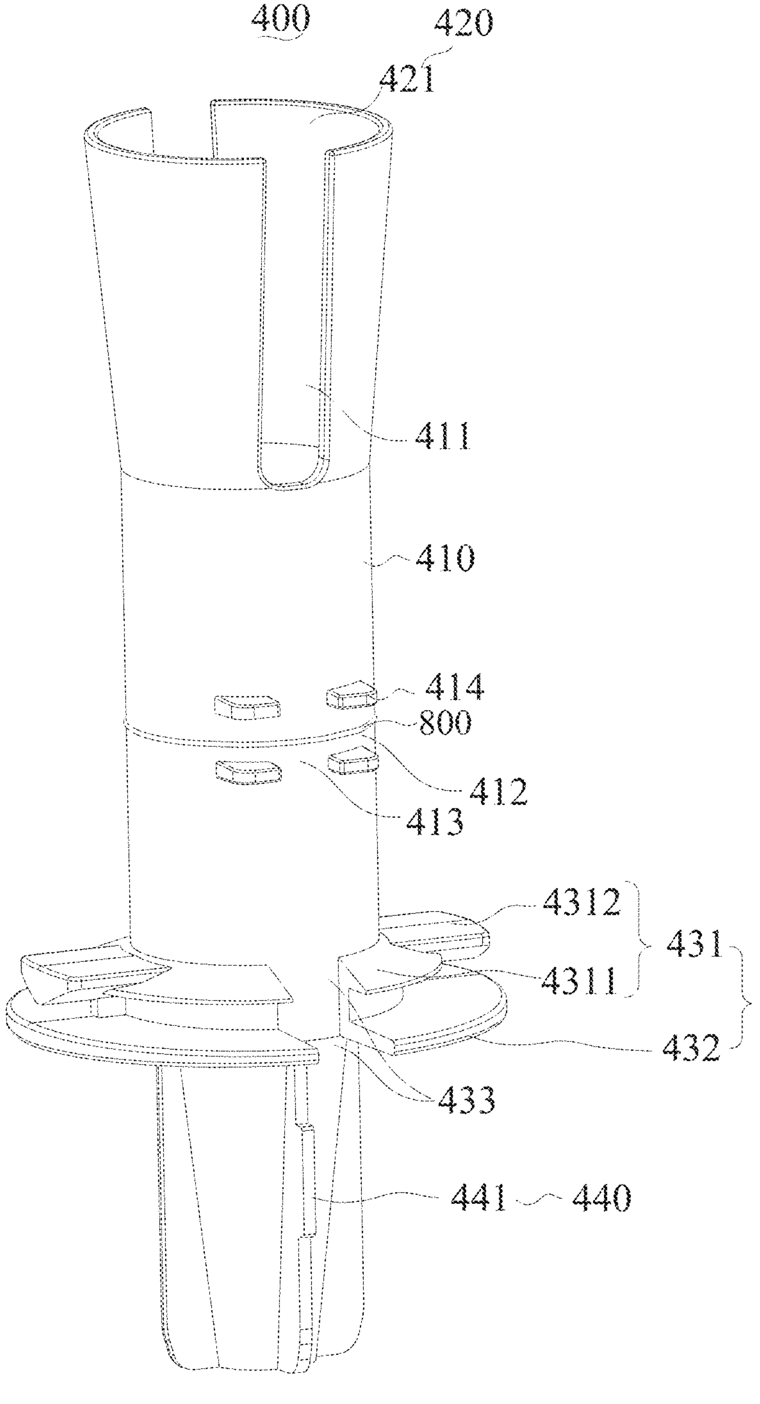
FIG. 6 is a first structural schematic diagram of a connecting component according to one embodiment of the present disclosure.

In some embodiments, please refer FIGS. 3 and 6, the light source component 100 includes a lamp holder 110 and a lamp bead 120, the lamp bead 120 is disposed on the lamp holder 110. The connecting component 400 is configured as a cylindrical structure, the mounting portion 420 is formed in a mounting groove 421 defined on a top of the main body 410. The lamp holder 110 is at least partially inserted into the mounting groove 420. The cylindrical structure of the connecting component 400 facilitates forming the mounting groove 421, and the mounting groove 421 is configured to ensure that the light source component 100 is not easy to move or loosen during use, thereby improving overall stability and reliability of the lighting fixture. Such plug-in design enables the light source component 100 to be quickly and easily mounted or replaced. The users only need to insert the bottom of the light source component 100 into the mounting groove 421, and no other complicated tools or step are required to mount the light source component 100, in this way, maintenance and replacement of the light source component 100 are more convenient.

In other embodiments, the mounting portion 420 is a snap-fit structure, and the lamp base 110 and the snap-fit structure are snap-fitted to achieve relative fixation. The mounting portion 420 includes a mounting platform, and the lamp base 110 is assembled and fixed to the mounting platform through threaded structures, such as screws and bolts. A specific form of the mounting portion 420 is not limited in the present disclosure.

Please refer to FIG. 1, for conveniently connecting the light source component 100 to the external power supply, the lighting fixture 10 further includes a wire 600, the wire 600 is connected to the light source component 100. A first wiring groove 411 is defined on the top of the main body 410, and the first wiring groove 411 penetrates through two opposite surfaces of the main body 410 in a thickness direction of the main body 410. Second wiring grooves 433 are defined on the fixing portion 430, the wire 600 sequentially passes through the first wiring groove 411 and the second wiring grooves 413 and extends outward. It can be understood that the light source component 100 is at least partially mounted in the mounting groove 421, after connecting the wire 600 to the light source component 100, the wire 600 extends out of the mounting groove 421 through the first wiring groove 411, and the wire 600 further extends out of an inner cavity, formed by fixing the lampshade 200 to the fixing base 300, through the second wiring grooves 433 to connect to the external power supply for energizing the light source component 100.

Please refer to FIG. 6, for conveniently fixing the wire 600, the lighting fixture 10 further includes a clamping component 800, the clamping component 800 is configured to fix the wire 600 on an outer wall surface of the main body 410. The clamping component 800 is capably of firmly fixing the wire 600, which reduces movement or loosening caused by vibration or other factors during use of the lighting fixture 10, thereby improving stability of the lighting fixture 10.

Please further refer to FIG. 6, a first positioning groove 412 is defined on the outer wall surface of the main body 410, the clamping component 800 is mounted in the first positioning groove. The first positioning groove 412 is configured to accurately fix the clamping component 800 to a predetermined position, so as to prevent the clamping component 800 from moving or loosening during the use of the lighting fixture 10, thereby improving stability of fixing the clamping component 800 to the wire 600. Moreover, the first positioning groove 412 simplifies a mounting process of the clamping component 800 and enables the clamping component 800 to be easier to align and fix, thereby adjustment requirements. The clamping component 800 is selected from a clamp, a band, a rubber ring, etc., which is not limited in the present disclosure A second positioning groove 413 is defined on the outer wall surface of the main body 410, the wire 600 is mounted in the second positioning groove 413. The second positioning groove 413 is configured to prevent the wire 600 from moving or loosening during the use of the lighting fixture 10, so as to improve the stability of the lighting fixture 10. The clamping component 800 and the wire 600 are more firmly fixed on the outer wall surface of the main body 410, thereby improving the stability of the lighting fixture 10.

In the present disclosure, the first positioning groove 412 and the second positioning groove 413 enable simpler and more rapid mounting processes of the clamping component 800 and the wire 600, mounting the wire 600 in the second positioning groove 413 and mounting the clamping component 800 in the first positioning groove 412 better organize the wire 600 and the clamping component 800, thereby providing a better overall appearance.

Please refer to FIG. 6, in some structural forms, four positioning protrusions 414 are disposed on the outer wall surface of the main body 410, the four positioning protrusions 414 are centrally symmetrically disposed to form the first positioning groove 412 and the second positioning groove 413. In this way, a manufacturing process of the lighting fixture 10 is simple, production efficiency of the lighting fixture 10 is high, the four positioning protrusions 414 protrude out of the outer wall surface of the main body 410, which is convenient for the users to place the wire 600 in the second positioning groove 413 and place the clamping component 800 in the first positioning groove 412. Certainly, in some other embodiments, the outer wall surface of the main body 410 is partially recessed inward to form the first positioning groove 412 and the second positioning groove 413.

Figure 7:
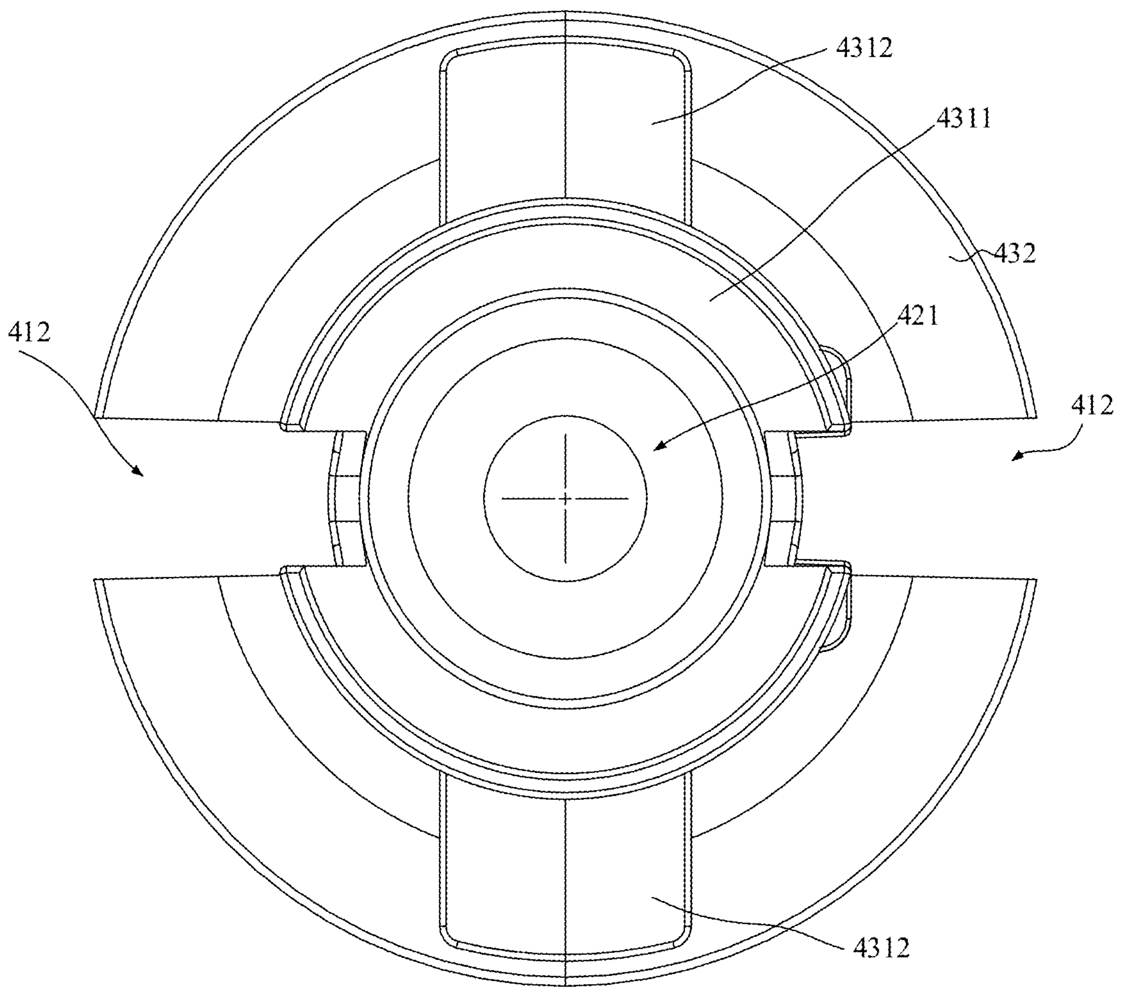
FIG. 7 is a second structural schematic diagram of the connecting component according to one embodiment of the present disclosure.
Figure 8:
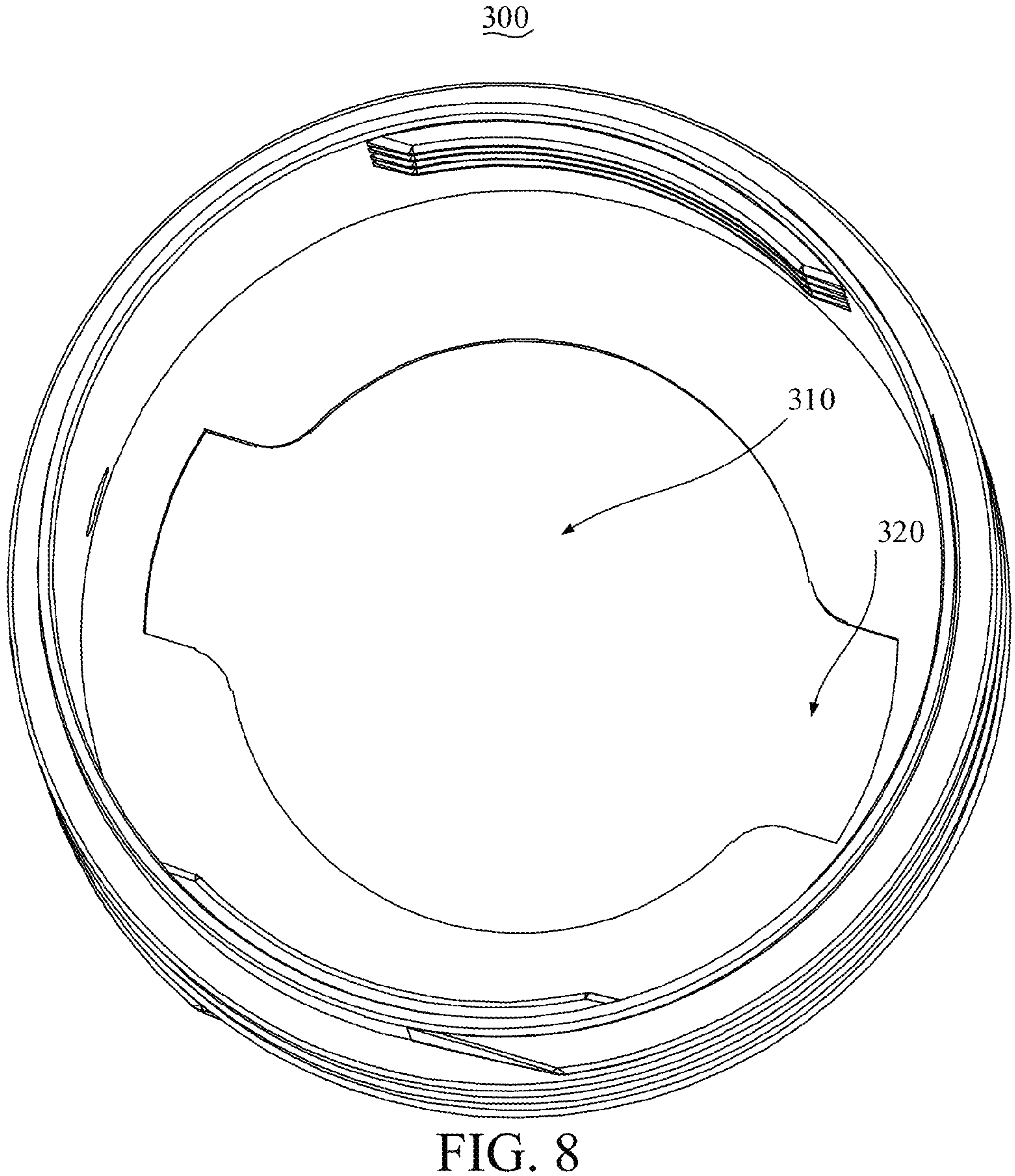
FIG. 8 is a structural schematic diagram of a fixing base according to one embodiment of the present disclosure.

Please refer to FIGS. 6-8, the fixing portion 430 includes a first fixing portion 431 and a second fixing portion 432, the first fixing portion 431 and the second fixing portion 432 are connected to an outer peripheral surface of the main body 410. The first fixing portion 431 includes a base portion 4311 and at least one second limiting portion 4312, the at least one second limiting portion 4312 are respectively connected to an outer side of the base portion 4311. A bottom of the fixing base 300 defines a middle hole 310 and at least one second limiting groove 320 communicated with the middle hole 310, a diameter of the middle hole 310 is greater than an outer diameter of the base portion 4311, and the diameter of the middle hole 310 is less than both a distance between one end of the at least one second limiting portion 4312 away from the base portion 4311 and one end of the base portion 4311 away from the at least one second limiting portion 4312 and an outer diameter of the second fixing portion 432. For example, two second limiting portions 4312 are provided, the two second limiting portions 4312 are respectively connected to two opposite sides of the base portion 4311, two second limiting grooves 320 are further provided in correspondence with the two second limiting portions 4312, and the diameter of the middle hole 310 is less than both a distance between farthest opposite ends of the two second limiting portions 4312 and the outer diameter of the second fixing portion 432.

Specifically, The first fixing portion 431 is closer to the mounting portion 420 than the second fixing portion 420, when the connecting component 400 is at a first angle relative to the fixing base 300, the main body 410, the base portion 4311, and the at least one second limiting portion 4312 that disposed at one side of the mounting portion 420 pass through the middle hole and the at least one second limiting groove, at this time, the light source component 100 mounted on the mounting portion 420 passes through the middle hole 310 and enters the lampshade. After the connecting component 400 is rotated and is at a second angle relative to the fixing base 300, the at least one second limiting portion 4312 and the second fixing portion 432 are respectively clamped on an upper surface of the bottom of the fixing base 300 and a lower surface of the bottom of the fixing base, thereby achieving a secure lock to preventing loosening. Such rotatable design is convenient for the users to assemble and disassemble the connecting component 400 and the fixing base 300, in this way, operation efficiency is improved.

Please refer to FIG. 7, angles of the first angle and the second angle differ by 90°, that is, after the connecting component 400 is inserted into the middle hole 310 at the first angle and is then rotated by 90°, the second limiting portions 4312 and the second fixing portion 432 are respectively firmly clamped on the upper surface of the bottom of the fixing base 300 and the lower surface of the bottom of the fixing base 300, which is simple in operation. In some other embodiments, the fixing portion 430 is a threaded structure disposed on the outer wall surface of the main body 410, and the fixing portion 430 is engaged with to the fixing base 300. The second wiring grooves 433 are respectively defined on the first fixing portion 431 and the second fixing portion 432. The second wiring groove 433 respectively defined on the first fixing portion 431 and the second fixing portion 432 are aligned in a vertical direction.

Figure 9:
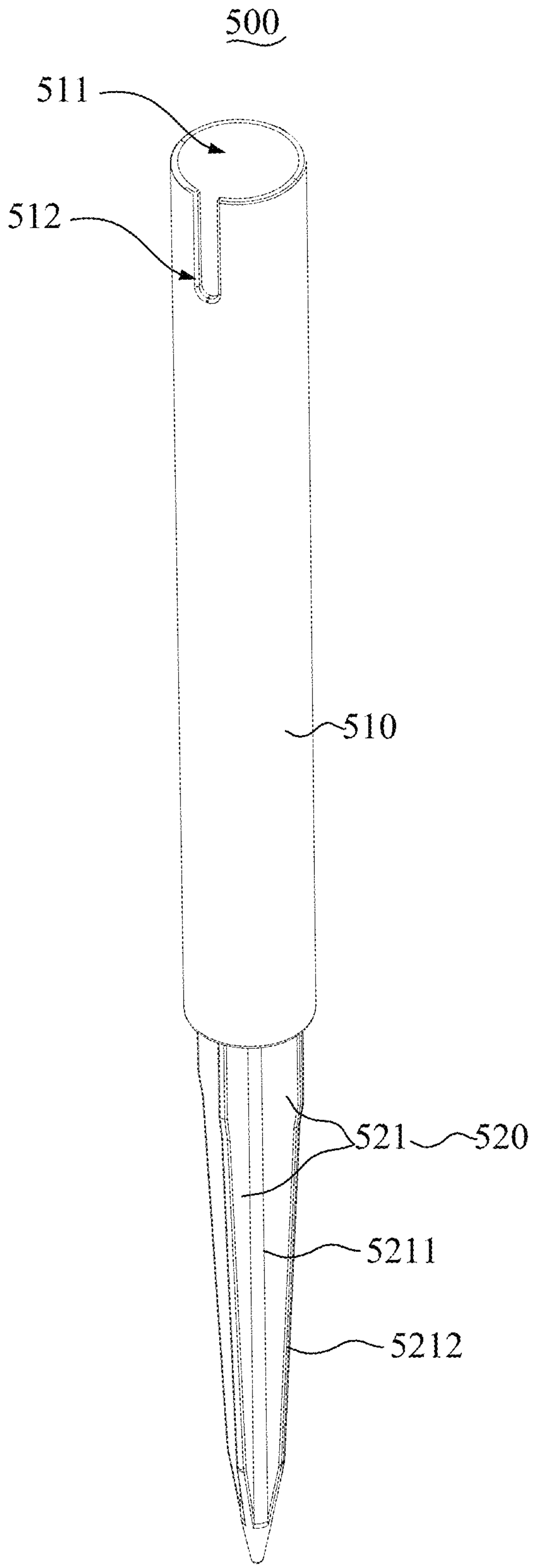
FIG. 9 is a structural schematic diagram of at least one supporting component according to one embodiment of the present disclosure.

Please refer to FIGS. 1 and 9, in some embodiments, the lighting fixture 10 further includes at least one supporting component 500, the at least one supporting component 500 includes a supporting portion 520 and an assembling portion 510, the supporting portion 500 is configured to support on a mounting surface. The connecting component 400 further includes a connecting portion 440, the connecting portion 440 is disposed below the fixing portion 430, and the connecting portion 440 is detachably connected to the assembling portion 510. The supporting portion 520 of the at least one supporting component 500 is supported on the mounting surface, so that the light source component 100 is capable of mounting at different positions according to the needs. The mounting surface includes, but is not limited to, a ground surface, a desktop, and a wall surface.

The at least one supporting component 500 is configured as a rod-shaped structure, an outer diameter of the assembling portion 510 is a fixed value, an outer diameter of the supporting portion 520 is gradually decreased in a direction away from the assembling portion 510, in this way, the supporting portion 520 is more smoothly inserted into the ground surface, resistance encountered in a mounting process in reduced. In the present disclosure, after the supporting portion 520 of the supporting member 500 is completely inserted into the ground surface, the assembling portion 510 supports the connecting component 400 and the light source component 100 at a certain height from the ground surface, which is convenient for lighting of the light source component 100. Moreover, adjusting a length of the assembling portion 510 is capable of adjusting a height of the lighting of the light source component 100.

In one embodiment, the supporting portion 520 is a telescopic rod, and the height of the lighting of the light source component 100 is adjusted by adjusting a length of the telescopic rod. In another embodiment, a plurality of supporting components 500 with different lengths are provided, and the connecting component 400 is connected to different supporting components 500 to adjust the height of the lighting of the light source component 100.

Please refer to FIG. 9, the supporting portion 520 includes a supporting main body 522 and blades 521, the blades 521 are disposed on the supporting main body 522 at intervals in a circumferential direction of the supporting main body 522, one end of the supporting main body 522 is connected to the assembling portion 510. A distance between an outer wall of each of the blades 521 and the supporting main body 522 is gradually decreased in a direction away from the assembling portion 510. in this way, one end of the supporting portion 520 away from the assembling portion 510 is more pointed, and when the supporting portion 520 are in contact with the ground surface, a larger force is concentrated to be on a smaller stress area, such concentrated force enables the supporting portion 520 to be more effectively inserted into the ground surface. Moreover, the blades 521 are fixed relative to the ground surface the a circumferential direction, so that the supporting portion 520 is firmly inserted into soil. In the embodiments of the present disclosure, four blades 529 are provided. In other embodiments, a number of the blades 521 is three, five, etc.

Please refer to FIG. 9, in some embodiments, the assembling portion 510 is configured as a cylindrical structure and defines a through hole 511, the connecting portion 440 includes ribs 441, the ribs 441 are disposed at intervals along a periphery of the main body 440 and abut against a hole wall of the through hole 511. In this way, the connecting component 400 is quickly assembled with the assembling portion 510. Moreover, the ribs 441 are disposed at intervals, which helps to more uniformly distribute an acting force and reduce stress concentration.

Figure 10:
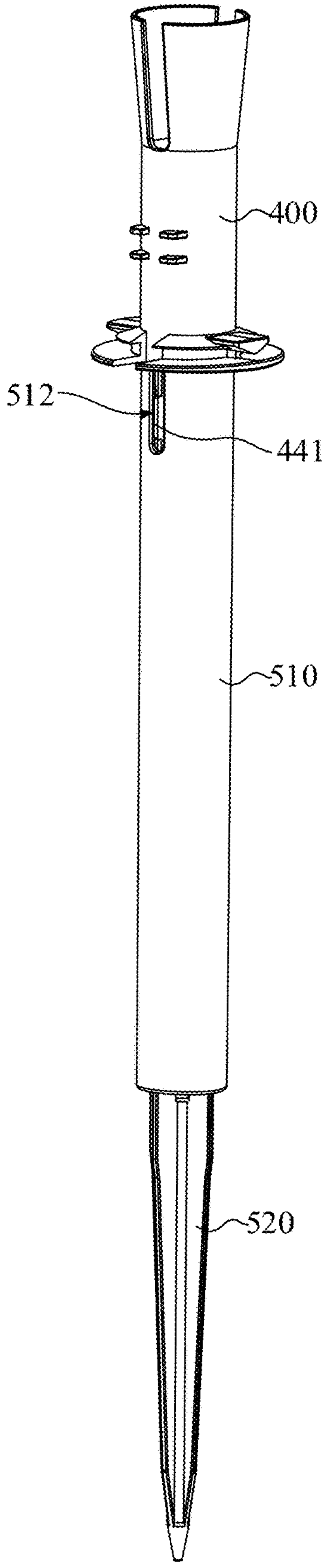
FIG. 10 is an assembly schematic diagram of the connecting component and the at least one supporting component.

Please refer to FIGS. 6, 9, and 10, the assembling portion 510 further includes at least one third positioning groove 512, the at least one third positioning groove 512 penetrates through the hole wall of the through hole 511. When the connecting portion 440 is inserted into the assembling portion 510, a corresponding one of the ribs 441 is mounted in the at least one third positioning groove 512, in this way, rotation between the at least one supporting component 500 and the connecting component 400 is prevented, thereby improving stability of supporting the connecting component 400 and the light source component 100 by the at least one supporting component 500. Moreover, since the at least one third positioning groove 512 penetrates through the hole wall of the through hole 511, the mounting portion 510 is more easily deformed, thereby reducing friction and resistance caused during assembling the lighting fixture 10, and further providing more smooth insertion.

In the present disclosure, the connecting component 400 includes the mounting portion 420, the fixing portion 430, and the connecting portion 440 disposed from top to bottom in sequence in a vertical direction, the mounting portion 420 is configured to mount the light source component 100, the fixing portion 430 is configured to detachably fix with the fixing base 300, which is convenient for fixing the light source component 100 in the lampshade 200 and detachably connecting the connecting component 440 to the at least one supporting portion 500, in this way, the mounting process is simple and the applicability of the lighting fixture 10 is improved, so that the lighting fixture 10 is suitable for difference usage scenarios.

In a second aspect, the embodiments of the present disclosure further provides a lighting device 1, the lighting device 1 includes lighting fixtures 10 having the same structure with the light fixture 10 as foregoing. The lighting device 1 further includes wires 600 configured to electrically connect the lighting fixtures 10 in series and a first plug 20 electrically connected to a first one of the wires 600, and the first one of the wires 600 is connected to a first one of the lighting fixtures 10 locating at a first end of the lighting device 1. In this way, when the first plug 20 is electrically to the external power supply, the light source components 100 of the light fixtures 10 are energized for lighting at the same time.

In some embodiments, the lighting device 1 further includes a second plug 30, the second plug 30 is electrically connected to a second one of the wires 600, the second one of the wires 600 is connected to a second one of the lighting fixtures 10 locating at a second end of the lighting device 1. The second plug 30 is connected to the first plug 20 of another lighting device 1 to achieve a serial connection. In this way, all light source components 100 of different lighting devices 1 are electrically connected in series. The present disclosure is capable of electrically connecting different lighting devices 1 in series according to actual needs, a number of the lighting device 1 is conveniently adjusted to modify a lighting layout, so as to achieve a wider lighting range and meet needs of the difference usage scenarios.

Same or similar reference numerals in the drawings of the embodiments of the present disclosure correspond to the same or similar components. In the description of the present disclosure, it should be understood that orientations or working position relationships indicated by terms “upper”, “lower”, “left”, “right”, etc. are only for ease of description of the present disclosure and simplified description, rather than indicating or implying that the referred device or element must have a specific orientation, and is constructed and operated in a specific orientation, so the terms describing the working position relationships in the accompanying drawings are only used for exemplary description and cannot be understood as a limitation to the present disclosure, and for those who skilled in the art, specific meanings of above terms may be understood according to specific situations.

The above are only preferred embodiments of the present disclosure and are not intended to limit the present disclosure, and any modification, equivalent replacement and improvement made within a spirit and a principle of the present disclosure shall fall within a protection scope of the present disclosure.

What is claimed is:

1. A lighting fixture, comprising:

a light source component;

a connecting component;

at least one supporting component;

a lampshade; and a fixing base;

wherein the lampshade is disposed around an exterior of the light source component, the lampshade comprises a first lampshade body and a second lampshade body, the first lampshade body is detachably connected to the second lampshade body;

the fixing base is detachably connected to the first lampshade body and the second lampshade body, and is configured to fix the first lampshade body and the second lampshade body;

the connecting component comprises a main body, a mounting portion, and a fixing portion, the mounting portion and the fixing portion are connected to the main body;

the mounting portion and the fixing portion are spaced apart in an extending direction of the connecting component;

the mounting portion is configured to mount the light source component, the fixing portion is detachably connected to the fixing base, and the light source component is fixed on an inner side of the lampshade;

the at least one supporting component comprises a supporting portion and an assembling portion, the supporting portion is configured to support on a mounting surface; and the connecting component further comprises a connecting portion, the connecting portion is connected to one side of the main body away from the mounting portion, and the connecting portion is detachably connected to the assembling portion.

2. The lighting fixture according to claim 1, wherein external threads are respectively disposed on the first lampshade body and the second lampshade body, internal threads are disposed on an inner wall of the fixing base, and the external threads are engaged with the internal threads.

3. The lighting fixture according to claim 1, wherein at least one positioning post is disposed on a first edge of the first lampshade body, at least one positioning hole is defined on a first edge of the second lampshade body, and the at least one positioning post is inserted into the at least one positioning hole; and/or a first limiting portion is disposed on a second edge of the first lampshade body, a first limiting groove is defined on a second edge of the second lampshade body, the first limiting portion is inserted into the first limiting groove.

4. The lighting fixture according to claim 1, wherein the connecting component is configured as a cylindrical structure, the mounting portion is formed in a mounting groove defined on a top of the main body, and a bottom of the light source component is inserted into the mounting groove.

5. The lighting fixture according to claim 4, wherein the lighting fixture further comprises a wire, the wire is connected to the light source component;

a first wiring groove is defined on the top of the main body, and the first wiring groove penetrates through two opposite surfaces of the main body in a thickness direction of the main body; and second wiring grooves are defined on the fixing portion, the wire sequentially passes through the first wiring groove and the second wiring grooves and extends outward.

6. The lighting fixture according to claim 5, wherein the lighting fixture further comprises a clamping component, the clamping component is configured to fix the wire on an outer wall surface of the main body.

7. The lighting fixture according to claim 6, wherein a first positioning groove is defined on the outer wall surface of the main body, the clamping component is mounted in the first positioning groove; and/or a second positioning groove is defined on the outer wall surface of the main body, the wire is mounted in the second positioning groove.

8. The lighting fixture according to claim 7, wherein four positioning protrusions are disposed on the outer wall surface of the main body, the four positioning protrusions are centrally symmetrically disposed to form the first positioning groove and the second positioning groove.

9. The lighting fixture according to claim 4, wherein the light source component comprises a lamp holder and a lamp bead, the lamp bead is disposed on the lamp holder, and the lamp holder is at least partially inserted into the mounting groove.

10. The lighting fixture according to claim 1, wherein the fixing portion comprises a first fixing portion and a second fixing portion, the first fixing portion and the second fixing portion are connected to an outer peripheral surface of the main body;

the first fixing portion comprises a base portion and at least one second limiting portion, the at least one second limiting portion is connected to an outer side of the base portion;

a bottom of the fixing base defines a middle hole and at least one second limiting groove communicated with the middle hole, a diameter of the middle hole is greater than an outer diameter of the base portion, and the diameter of the middle hole is less than a distance between one end of the at least one second limiting portion away from the base portion and one end of the base portion away from the at least one second limiting portion and an outer diameter of the second fixing portion;

the first fixing portion is closer to the mounting portion than the second fixing portion, when the connecting component is at a first angle relative to the fixing base, the main body, the base portion, and the at least one second limiting portion partially pass through the middle hole and the at least one second limiting groove; and after the connecting component is rotated and is at a second angle relative to the fixing base, the at least one second limiting portion and the second fixing portion are respectively clamped on an upper surface of the bottom of the fixing base and a lower surface of the bottom of the fixing base.

11. The lighting fixture according to claim 1, wherein the at least one supporting component is configured as a rod-shaped structure, an outer diameter of the supporting portion is gradually decreased in a direction away from the assembling portion.

12. The lighting fixture according to claim 1, wherein the supporting portion comprises a supporting main body and blades, the blades are disposed on the supporting main body at intervals in a circumferential direction of the supporting main body, one end of the supporting main body is connected to the assembling portion;

a distance between an outer wall of each of the blades and the supporting main body is gradually decreased in a direction away from the assembling portion.

13. The lighting fixture according to claim 1, wherein the assembling portion is configured as a cylindrical structure and defines a through hole, the connecting portion comprises ribs, the ribs are disposed at intervals along a periphery of the main body and abut against a hole wall of the through hole.

14. The lighting fixture according to claim 13, wherein the assembling portion further comprises at least one third positioning groove, the at least one third positioning groove penetrates through the hole wall of the through hole; and when the connecting portion is inserted into the assembling portion, a corresponding one of the ribs is mounted in the at least one third positioning groove.

15. The lighting fixture according to claim 1, wherein the lighting fixture further comprises a hook, the hook is detachably connected to the fixing base.

16. A lighting device, comprising:

lighting fixtures;

wires configured to electrically connect the lighting fixtures in series; and a first plug electrically connected to a first one of the wires;

wherein the first one of the wires is connected to a first one of the lighting fixtures locating at a first end of the lighting device;

each of the lighting fixtures comprises a light source component, a connecting component, at least one supporting component, a lampshade, and a fixing base;

the lampshade is disposed around an exterior of the light source component, the lampshade comprises a first lampshade body and a second lampshade body, the first lampshade body is detachably connected to the second lampshade body; and the fixing base is detachably connected to the first lampshade body and the second lampshade body, and is configured to fix the first lampshade body and the second lampshade body;

the connecting component comprises a main body, a mounting portion, and a fixing portion, the mounting portion and the fixing portion are connected to the main body;

the mounting portion and the fixing portion are spaced apart in an extending direction of the connecting component;

the mounting portion is configured to mount the light source component, the fixing portion is detachably connected to the fixing base, and the light source component is fixed on an inner side of the lampshade;

the at least one supporting component comprises a supporting portion and an assembling portion, the supporting portion is configured to support on a mounting surface; and the connecting component further comprises a connecting portion, the connecting portion is connected to one side of the main body away from the mounting portion, and the connecting portion is detachably connected to the assembling portion.

17. The lighting device according to claim 16, wherein the lighting device further comprises a second plug, the second plug is electrically connected to a second one of the wires, the second one of the wires is connected to a second one of the lighting fixtures locating at a second end of the lighting device; and the second plug is connected to the first plug of another lighting device to achieve a serial connection.

18. The lighting device according to claim 16, wherein external threads are respectively disposed on the first lampshade body and the second lampshade body, internal threads are disposed on an inner wall of the fixing base, and the external threads are engaged with the internal threads.

19. A lighting fixture, comprising:

a light source component;

a connecting component;

a lampshade; and a fixing base;

wherein the lampshade is disposed around an exterior of the light source component, the lampshade comprises a first lampshade body and a second lampshade body, the first lampshade body is detachably connected to the second lampshade body;

the fixing base is detachably connected to the first lampshade body and the second lampshade body, and is configured to fix the first lampshade body and the second lampshade body;

the connecting component comprises a main body, a mounting portion, and a fixing portion, the mounting portion and the fixing portion are connected to the main body;

the mounting portion and the fixing portion are spaced apart in an extending direction of the connecting component;

the mounting portion is configured to mount the light source component, the fixing portion is detachably connected to the fixing base, and the light source component is fixed on an inner side of the lampshade;

the fixing portion comprises a first fixing portion and a second fixing portion, the first fixing portion and the second fixing portion are connected to an outer peripheral surface of the main body;

the first fixing portion comprises a base portion and at least one second limiting portion, the at least one second limiting portion is connected to an outer side of the base portion;

a bottom of the fixing base defines a middle hole and at least one second limiting groove communicated with the middle hole, a diameter of the middle hole is greater than an outer diameter of the base portion, and the diameter of the middle hole is less than a distance between one end of the at least one second limiting portion away from the base portion and one end of the base portion away from the at least one second limiting portion and an outer diameter of the second fixing portion;

the first fixing portion is closer to the mounting portion than the second fixing portion, when the connecting component is at a first angle relative to the fixing base, the main body, the base portion, and the at least one second limiting portion partially pass through the middle hole and the at least one second limiting groove; and after the connecting component is rotated and is at a second angle relative to the fixing base, the at least one second limiting portion and the second fixing portion are respectively clamped on an upper surface of the bottom of the fixing base and a lower surface of the bottom of the fixing base.

* * * * *